United States Patent [19]

Ort

[11] 4,372,292

[45] Feb. 8, 1983

[54] METHOD AND APPARATUS FOR CONSTRUCTION OF A SOLAR COLLECTOR

[76] Inventor: Sterling L. Ort, R.D. #1, Box #14, Lewisberry, Pa. 17339

[21] Appl. No.: 254,054

[22] Filed: Apr. 14, 1981

[51] Int. Cl.³ .............................. F24J 3/02; E06C 2/38
[52] U.S. Cl. .................................... 126/450; 52/200; 52/656
[58] Field of Search .............. 126/450; 52/173 R, 62, 52/200, 788, 656

[56] References Cited

U.S. PATENT DOCUMENTS

| | | | |
|---|---|---|---|
| 143,352 | 9/1873 | Johnson et al. | 52/474 |
| 1,840,041 | 1/1932 | Kellogg | 52/200 |
| 2,097,821 | 11/1937 | Mathers | 52/474 |
| 2,202,756 | 5/1940 | Cline | 126/418 |
| 2,551,950 | 5/1951 | Johnson | 52/788 |
| 3,180,459 | 4/1965 | Liskey, Jr. | 52/474 |
| 3,731,439 | 5/1973 | Hickman | 52/62 |
| 3,748,793 | 7/1973 | Tompkins et al. | 52/474 |
| 3,797,049 | 3/1974 | De Santo | 52/474 |
| 3,844,086 | 10/1974 | Radtke | 52/474 |
| 3,974,616 | 8/1976 | Beckley | 220/84 |
| 4,147,156 | 4/1979 | Hopper | 126/417 |
| 4,172,311 | 10/1979 | Heyman | 126/417 |
| 4,178,909 | 12/1979 | Goolsby et al. | 126/417 |
| 4,194,497 | 3/1980 | Gramer et al. | 126/417 |
| 4,215,677 | 8/1980 | Erickson | 126/417 |
| 4,261,329 | 4/1981 | Walsh et al. | 126/417 |
| 4,261,330 | 4/1981 | Reinisch | 126/418 |
| 4,269,173 | 5/1981 | Krueger | 126/417 |
| 4,270,516 | 6/1981 | Hopper et al. | 126/417 |
| 4,278,070 | 7/1981 | Bowen | 126/417 |
| 4,284,070 | 8/1981 | Wilke | 126/450 |
| 4,291,684 | 9/1981 | Werner | 126/450 |

FOREIGN PATENT DOCUMENTS 2036912  9/1978  United Kingdom ................. 52/656

Primary Examiner—Samuel Scott
Assistant Examiner—G. Anderson
Attorney, Agent, or Firm—Steele, Gould & Fried

[57] ABSTRACT

A solar collector apparatus and method for a collector adapted to be mounted on a structure and connected to supply and discharge of fluid to be heated by the collector is disclosed, comprising a layer of insulation laid upon the structure; fluid carrying means for the heat transfer fluid, mounted atop the insulation and exposed to solar radiation; at least one layer of transparent material positioned above an air space over the fluid carrying means for insulating the fluid carrying means from ambient temperatures; a plurality of outer frame members having a cross-section defining an interconnection opening, a stepped portion to support the transparent material and means for attachment to the structure; and, at least one interconnection member dimensioned to fit tightly but slideably within the interconnection opening of the outer frame members and extend therefrom, whereby two or more outer frame members may be aligned by placing them over the interconnection member. The hollow outer frame members are equipped with a downwardly-extending flange and a spacer which secures and supports flashing to protect the collector from rainwater. An inner frame member is also disclosed, whereby a large solar collector skylight or greenhouse may be assembled from easily transportable units.

10 Claims, 4 Drawing Figures

METHOD AND APPARATUS FOR CONSTRUCTION OF A SOLAR COLLECTOR

BACKGROUND OF THE INVENTION

1. Field of the Invention

This invention relates to the field of design and construction of insulated transparent structures such as solar collectors, greenhouses, skylight and the like, and in particular to solar collectors adapted to be mounted on the roof of a structure and connected to a supply and discharge of a heat transfer fluid to be heated by the collector, the heat transfer fluid eventually discharging energy into a heat reservoir or an object or space to be heated.

2. Description of the Prior Art

The general idea of a solar collector mounted on a rooftop is well known. There are nevertheless many variations on the general idea. Collectors have been disclosed that collect heat using pipes to carry heat transfer fluid through an area heated by the sun, devices to flow heat transfer fluid over a heated surface, and even use of colored or otherwise darkened heat transfer fluid. The present invention relates to the construction and structural design of solar collectors and the like, rather than to a particular method of collecting.

Solar collectors available on the market are often pre-packaged to be merely positioned on the roof of a structure and attached. While such pre-packaged units are convenient for some applications, a problem is presented where a very large collector is contemplated. As one option, a builder might connect a series of smaller, pre-packaged solar collectors into a larger system. Alternatively, the builder must assemble an entire solar collector panel at the job site. Inasmuch as the assembly must be conducted at least partly by workmen dangling from ladders, scaffolds, etc., usually on sloping rooftops, the finished product often leaves much to be desired.

Solar collectors are regularly exposed to exceedingly harsh conditions while in use. The structure and heat-collecting apparatus are exposed to scorching temperatures in the daytime, and freezing temperatures at night, often during the same 24 hour period. Different materials in the collector structure expand and contract differently during temperature cycling, gradually opening up the joints. Rain will fall and ice will freeze on the solar collectors and minor inadequacies in construction will permit the natural elements to gradually wear away and ruin the collector, moisture leaking into the collector from outside, and seals and connections gradually coming apart.

From the inside, in collectors employing water as a heat transfer fluid, calcium and other scale deposits precipitate on internal surfaces and eventually impede or obstruct fluid flow. Any liquid leaking fom the internal fluid passages tends to compound the problem of fluid leaking in from outside. As fluid in the interstices is heated and cooled, joints are stressed. Inasmuch as substantial temperature cycling is encountered by the device in use, the entire collector will deteriorate in a relatively short time, often before the unit has paid for itself in terms of fuel savings, unless great care is taken to make the unit structurally strong.

Accordingly, there has been a need for a solar collector construction system and apparatus that will allow even a large solar collector to be very solidly and tightly constructed on the site, yet provides all the advantages of increased efficiency that the art can provide. Since solar collectors have become popular, new installations appear frequently. Where a large structure is intended to be heated by a solar collector, or where substantial backup heating capability is desired, a system for solidly constructing such large solar collector devices will fill a need that is not adequately met by smaller integral units daisy-chained together or by larger units haphazardly constructed.

SUMMARY OF THE INVENTION

It is the primary object of this invention to provide a solar collector that is easy to construct yet substantial and strong, even in large collector installations installed in precarious locations.

It is also an object of this invention to reduce the cost of solar collectors.

It is yet another object of this invention to bring the advantages of pre-packaged solar collectors to large, custom installations.

These and other objects are accomplished by a solar collector of the type adapted to be mounted on a structure and connected to means for supplying and discharging a heat transfer fluid to be heated by the collector, comprising at least one layer of insulation laid upon the structure; fluid carrying means for the heat transfer fluid, mounted atop the insulation and exposed to solar radiation; at least one layer of transparent material positioned above an air space over the fluid carrying means, for insulating the fluid carrying means from ambient temperatures; a plurality of outer frame members having, in cross-section, a horizontal member to support the transparent material and a base for attachment to the structure, said cross-section defining an interconnection opening; and, at least one interconnection member dimensioned to fit closely within the outer frame members and extend therefrom, whereby two or more outer frame members may be aligned by placing them over the interconnection member. The hollow outer frame members are provided with integrally attached means for securing flashing along the periphery of the collector, the means comprising a flange extending generally downwards from an upper area of the outer frame members and a spacer member mounted on the outer frame members just below the downwardly-extending flange, whereby the flashing is securely held against the downwardly extending flange by the spacer member. The opposite edge of the flashing is positioned under adjoining roofing material, and counter flashing may be included. An inner frame member attached to a standoff support has two stepped portions to support segments of the transparent material on either side thereof, the standoff support resting on the structure and positioning the inner frame member above the fluid carrying means. One or more layers of transparent material, for example glass, are positioned above the air space over the fluid carrying means, and spacers between the transparent layers provide air spaces between each layer and the next, resilient caulk serving to cement and insulate the respective layers and spacers.

DETAILED DESCRIPTION OF THE PREFERRED EMBODIMENTS

Figure 1:
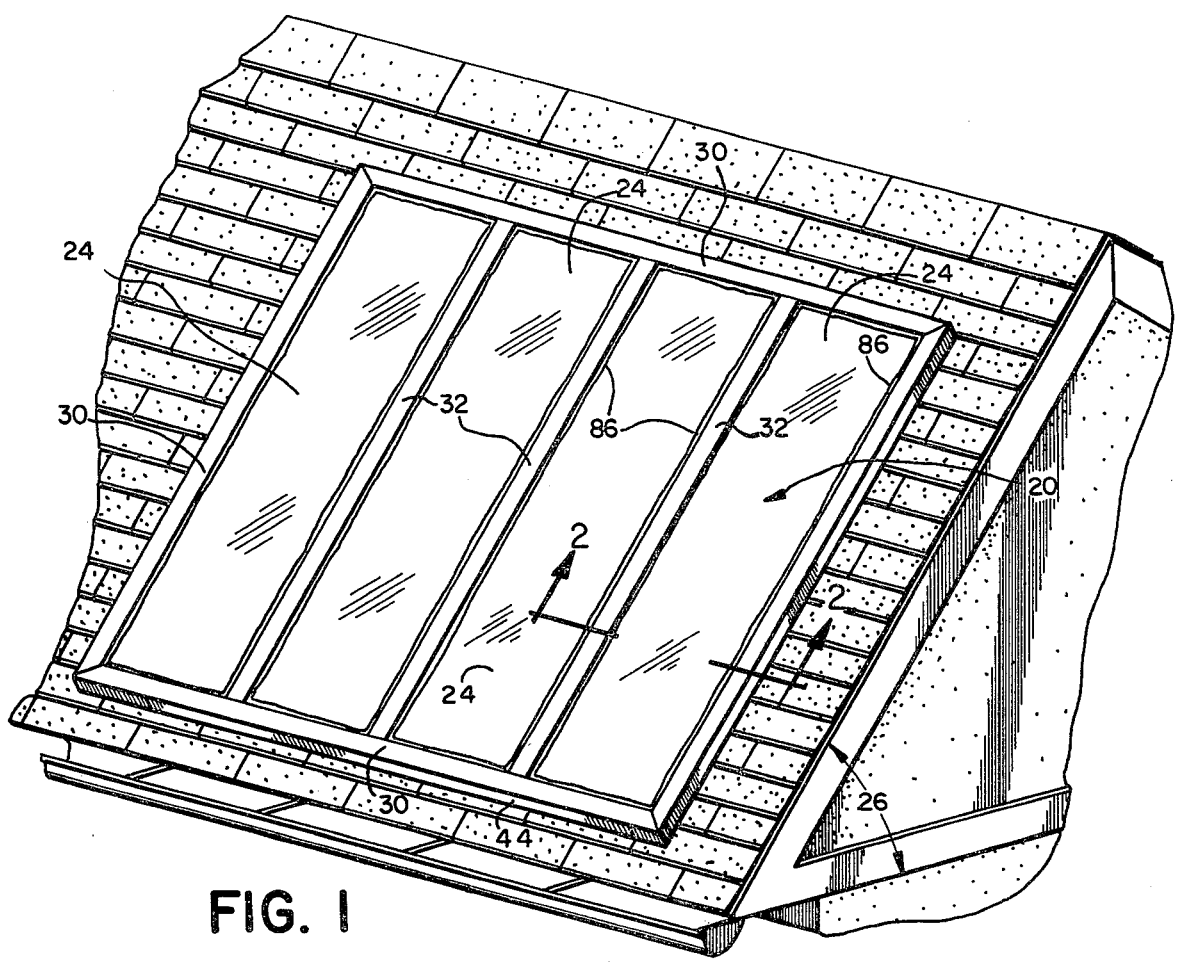
FIG. 1 is a perspective view of the solar collector of this invention, mounted atop a structure.

The end product of this invention, solar collector 20, is shown mounted atop a structure in FIG. 1. Collector 20 is large with respect to the structure 22 upon which it is mounted. FIG. 1 depicts the collector as laying flat against the sloping roof at angle 26. It will be appreciated that the slopes of the roofs of structures vary widely, and that there is an optimum slope and direction for the collector, the slope being dependent on the latitude of the location at which the structure is located. The present invention will be discussed in terms of a collector mounted directly to a roof. The invention also encompasses the situation where one or another of the ends of the collector must be raised to achieve the proper optimum slope for maximum incidence of solar radiation.

The collector comprises outer frame members 30 arranged in a rectangular shape. Inner frame members 32 divide the total collector up into segments. While the collector may be constructed as a single "segment" using a single large pane of glass, rather than the smaller segments as divided by inner frame members 32, construction of such a collector would be unwieldy, the glass expensive, and a major disaster would occur if the panel was broken, e.g., by a baseball. To ensure sufficient strength to withstand such breakage, extremely thick, heavy and expensive glass, or plastic less easily broken but more prone to scratching and weathering must be used. By dividing the collector into panels as shown in FIG. 1, smaller pieces of glass or other transparent material 24 are required, and if one should be broken, the damage would not be extraordinary. In addition, strengthened or tempered glass may be used to minimize risk of damage.

Although a segmented collector as shown requires nearly the same total glass area as would a collector having one large pane, the smaller glass parts are more easily transported and mounted. Workmen in the insecure work location of the sloping roof can more easily build a strong, tight structure comprising segments of the more workable size. FIG. 1 shows segments that are as long vertically as is the collector. Inner frame members 32, which are partly supported along cutouts at their ends laid upon the supporting surfaces of outer frame members 30, can also be attached horizontally, i.e., at least one end supported along a cutout laid upon a vertically oriented inner frame member 32. Therefore, horizontally divided segments are also conveniently constructed. Even diagonal divisions can be used if desired, because the glass-supporting surfaces of both inner frame members 30 and outer frame members 32 are level with respect to one another and quite capable of supporting additional inner frame members oriented as necessary.

Figure 2:
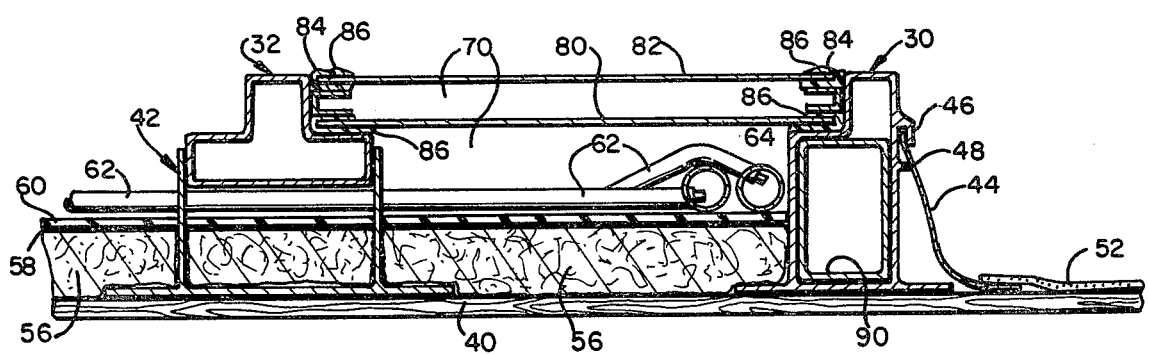
FIG. 2 is a section view taken along lines 2—2 in FIG. 1.

As shown in cross-section in FIG. 2, the relatively plain external appearance of the finished collector belies the complexity of the inner parts. In general, heat transfer fluid supplied and discharged by large pipes 64 is passed along smaller pipes 62 in the area under transparent panes 80, 82. Air spaces are provided both between panes 80, 82 and between inner pane 80 and the fluid carrying pipes 62. These air spaces provide insulation between the fluid carrying means and the ambient air around the collector, allowing the air space around fluid carrying pipes 62 to become quite hot, even when the air outside outer pane 82 is quite cold.

FIG. 2 shows supply and discharge pipes 64, positioned vertically alongside one another at one extreme of the collector, smaller pipes 62 comprising horizontal loops. There are many variants to the general theme of collecting heat through fluid carrying pipes. For example, supply pipes are sometimes provided at the upper edge of the collector, and the fluid passed through vertically oriented pipes or trickled across a surface to be collected and discharged at the lower end of the solar collector. Such variations are known in the art, and the present invention is more concerned with the construction of the respective elements than with the particular design of the heat capturing mechanism.

Insulation 56 improves the capacity of the air space under inner pane 80 to retain heat. Insulation 56 prevents heat transfer either from roof 40 to the collector or vice versa. A foil layer 58 atop insulation 56 reflects any radiant heat. Insulation 56, which may be fiberglass, styrofoam, etc. comprises internal air spaces and tends to prevent heat transfer by convection or conduction. Immediately below fluid carrying pipes 62 an additional layer 60 of dark mounting material, for example black rubber, absorbs the sun's heat energy and holds the same in the area of fluid carrying pipes 62, also black rubber, for transfer to the heat transfer fluid. Pipes 62 may also be equipped with more durable plastic internal sleeves to improve their useful life, rubber tending to crack and dry out with age.

Collector frame members 30, 32 serve to support the transparent panes 80, 82 and to enclose the entire apparatus in an air space. As discussed hereinabove, use of internal frame members 32 allows use of smaller pieces of glass, facilitating construction and preventing excessive damage should a projectile strike the collector.

Figure 3:
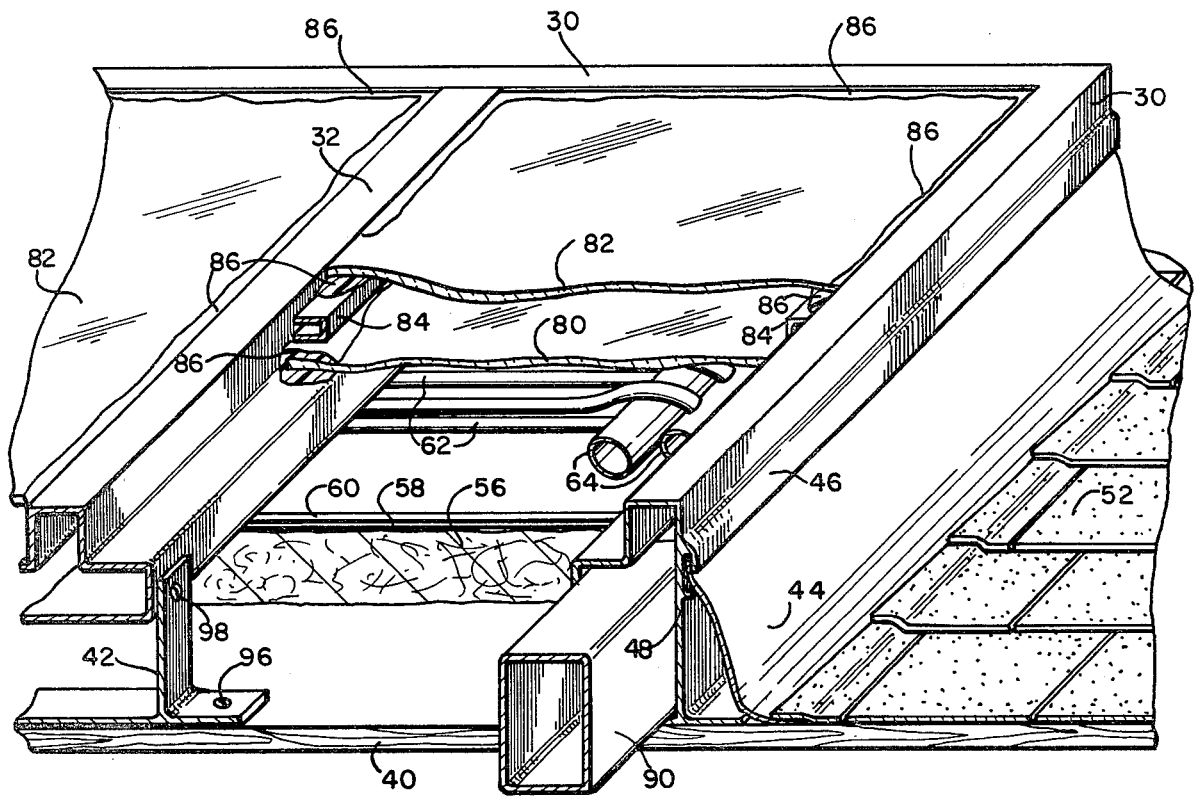
FIG. 3 is a perspective cutaway view illustrating the respective layers of construction in the area of section 2—2 in FIG. 1.

FIG. 3 illustrates the various layers in cutaway. As shown, the dimensions of frame members 30, 32 and the respective layers 56, 58, 60, bring the level of pipes 62 to just under the lower edge of inner frame member 32. A horizontal bearing surface on inner frame member 32, supported by standoff 42, holds the glass panes 80, 82 at the same level as that maintained by a similar area on outer frame member 30. Both inner frame member 32 and outer frame member 30 are made of anodized extruded aluminum tubing. The aluminum is lightweight, and anodizing the aluminum makes it more attractive as well as darker and more able to absorb heat energy. FIG. 5 illustrates the innerconnection of outer frame members 30 and inner frame members 32. At the corners 112 of the collector apparatus, outer frame members 30 are cut at a 45° angle. In constructing the unit, however, the builder may find it difficult to position the vertical and horizontal frame members 30 at the exact proper angle for a square frame. Any error in the mitre of the corners would necessitate a weld spanning the resulting gap, or could require recutting, repositioning, measuring, and other inconveniences. It is, of course, preferred that the mitres be accurately cut and the corners merely welded. Where this is impracticable, however, a positioning member 94, which may be produced to the proper dimensions in the quiet of the producer's workshop, may be used to position the vertical and horizontal outer frame members. Upon insertion of positioning member 94 into the hollow of outer frame 30, the correct alignment of the respective frame members is assured. Since the inner member 94 tightly but slideably fits into outer frame 30, errors in the cut or positioning of the corners do not result in large gaps in the frame.

Interconnection or positioning members 90,94 both perform the function of positioning abutting portions of outer frame members 30 with respect to one another to effect the interconnection thereof. Right angle 94 positions the frame members at corners, and straight section 90 aligns frame members across straight spans. Should the builder have the luxury of an installation conforming to standard lengths of stock, straight positioners 90 can be omitted. In addition, should the builder be confident about his ability to cut exact mitres at the jobsite, right angle 90 may be omitted.

It is presently preferred that only straight positioners 90 be employed in the usual installation. Long pieces of outer frame 30 are pre-welded to shorter pieces at 90°, for example, forming a group of "L" shaped units. These units may be prepared in the quiet of the shop, being very precisely cut and welded. The "L" shaped units are then joined at the jobsite using straight positioners 90, and the joints are caulked only. Accordingly to this preferred method, the builder need not move his welding equipment to the jobsite, and requires no special power source or protected location. Nevertheless, the collector is strong and readily assembled.

Figure 4:
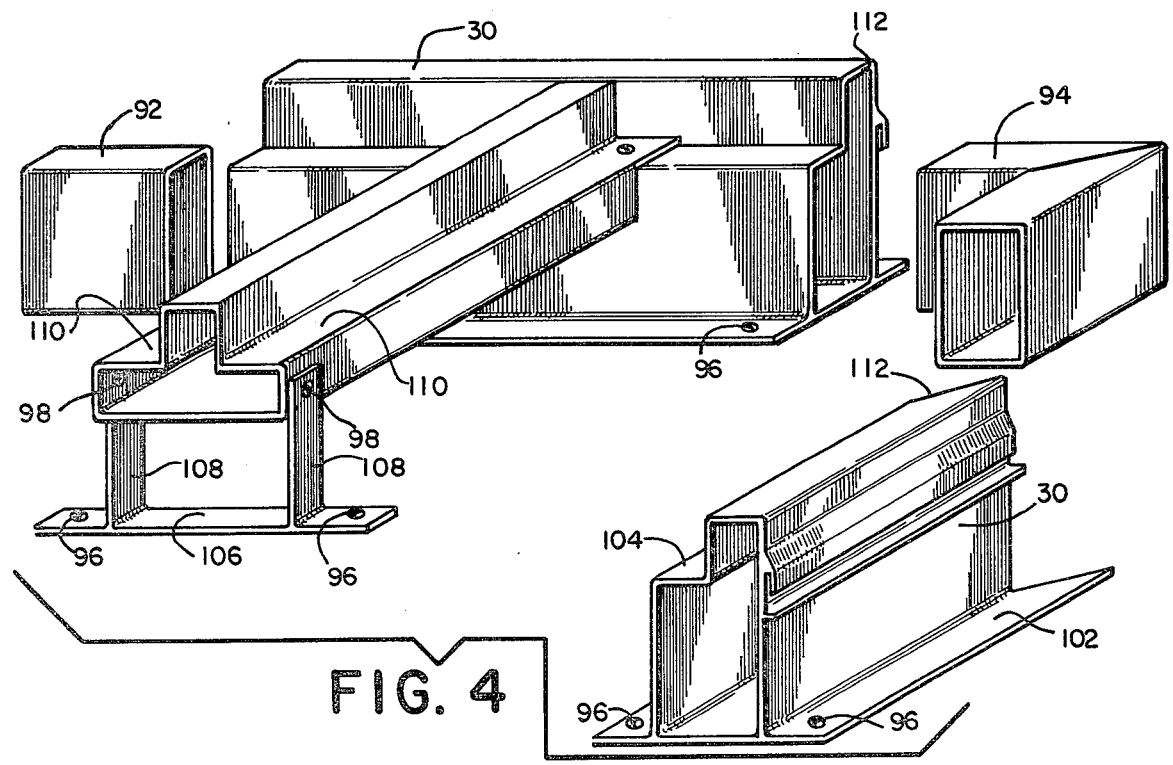
FIG. 4 is a perspective view illustrating the interconnection of inner and outer frame members, and the connections therebetween.

Inner frame member 32 must be positioned with respect to outer frame members 30, and with respect to other inner frame members, in order to accomodate a standard sized glass pane. However, this measurement may be easily accomplished using a spacer of the same dimension as the width of the glass. As shown in FIG. 4, inner frame member 32 is merely cut to a proper length, notched along the bottom thereof to overfit the outline of outer frame 30, and riveted. Similarly, inner frame member 32 is riveted to the standoff support 42, which is affixed to the roof by screws 96. Outer frame member 30 is also affixed to the roof by screws 96. The point of innerconnection along mitred edge 112 should be secured by welding or braising to provide a strong corner. Other junctions can be welded as well, if desired. Since the positioning members 90, 94 extend to just under the surface of frame 30, any gap between sections of frame 30 can be easily closed, for example by a heliarc weld.

In order to ensure an adequate thermal barrier between the ambient air and the air space below inner pane 80, an air space is provided by spacers 84, positioned between the panes 80, 82. A suitable resilient caulking material, such as polyvinylchloride or that sold under the name RTV, is placed along the stepped portions of inner frame member 32 and outer frame member 30, before the first glass pane 80 is positioned. Similarly, such caulking is applied atop the edges of inner pane 80, covered by spacer 84. In addition, the caulk is placed between upper pane 82 and spacer 84, as well as to fill any crack which remains between pane 82 and the frame members 30, 32. Finally, caulking is applied to any unwelded junctions between segments of outer frame members 30, which are secured by inner positioning fittings 90, 92, 94. A bead of caulk should extend above each joint, precluding any depression that might hold moisture.

Inner positioning members are shown in FIGS. 2, 3 and 4 correctly positioning abutting segments wherever needed. In FIG. 3, inner positioning member 90 extends from a vertical segment of outer frame member 30; in FIG. 4, inner positioning member 92 extends from a horizontal segment. Since short lengths of straight tubing may be thus combined to make up a full frame members 30, 32, less material is wasted. Nevertheless, each joint is secure, and correct alignment assured.

To finally secure the collector from rain, snow and ice, flashing 44 protects the outer edge of the collector, and eases the transition to roofing shingles 52. Flashing 44 is held securely in position by the interaction of flange 46, spacer 48 and shingles 52. Slightly raised portion 48 on outer frame member 30 just below flange 46 forces a bend in the relatively stiff conventional flashing material, for example aluminum. Shingles 52 oppose the force exerted against the flashing by extending spacer 48, which otherwise would cause the flashing to extend outward more horizontally. It will therefore be appreciated that upon completion, the flashing is held resiliently and securely between flange 46 and shingles 52 by action of spacer 48.

Further variations are possible on the present invention, and will now be apparent to those skilled in the art. As discussed hereinabove, many variants to the means of directing heat transfer fluid across the surface exposed to solar radiation are possible. In addition, further prefabrication systems of elements of a solar collector based on this invention will now be apparent. Reference should be made to the appended claims, rather than the foregoing specification, as indicating the true scope of the subject invention.

I claim:

1. A solar collector having a liquid heat transfer fluid carrying means exposable to solar radiation and connectable to a heat transfer fluid circulating system, the collector comprising:

at least one layer of transparent material positioned above an air space over the liquid heat transfer fluid carrying means, for insulating and sealing the heat transfer fluid carrying means from ambient conditions;

a plurality of outer frame members for bearing the transparent material and for enclosing and sealing the heat transfer fluid carrying means from ambient conditions, about its perimeter, each outer frame member having means for attachment to a collector-bearing structure and comprising, in cross-section, at least one inner and at least one outer vertical wall section providing abutment surfaces against lateral movement and at least one upper and at least one lower horizontal section providing abutment surfaces against vertical movement, the at least four abutment surfaces defining an interconnection opening for positively aligning and joining the outer frame members;

a plurality of interconnection members, each dimensioned to be fitted longitudinally into the interconnection openings of adjacent outer frame members, whereby all of the outer frame members may be positively and permanently aligned and interconnected by the interconnection members.

2. The solar collector of claim 1, further comprising means for securing flashing around the periphery of the collector, said means comprising a flange rigidly attached to the outer frame members and extending first outwardly and then downwardly from an upper area of the outer frame member and a spacer member mounted on the outer frame members below the downwardly-extending first flange, whereby the flashing is forced against the downwardly-extending portion of the first flange by the spacer member.

3. The solar collector of claim 2, wherein the flashing is further secured by insertion under roofing material on the structure, at an end of the flashing opposite the flange.

4. The solar collector of claim 2, wherein the outer frame members are extruded, anodized aluminum and the flange is extruded integrally therewith.

5. The solar collector of claims 1 or 2, further comprising at least one inner frame member extending between the outer frame members, said inner frame members supported and positioned by a standoff and attached at each end to the outer frame members, the inner and outer frame members having aligned auxiliary support surfaces for the transparent material, the standoff positioning the inner frame member above the heat transfer fluid carrying means.

6. The solar collector of claim 5, wherein two layers of transparent material are positioned above the air space over the fluid carrying means, the inner and outer frame members supporting a first layer of transparent material, a spacer and a second layer of transparent material, whereby a second air space between the transparent layers is provided.

7. The solar collector of claim 6, further comprising resilient caulk applied between and separating the frame members, the transparent material and the spacer, whereby a barrier to conduction of heat is provided between the fluid carrying means and ambient conditions.

8. A solar collector having heat transfer fluid carrying means exposable to solar radiation and connectable to a heat transfer fluid circulating system, the collector comprising:
   at least one layer of transparent material positioned above an air space over the fluid carrying means, for insulating and sealing the fluid carrying means from ambient conditions;
   a plurality of outer frame members for bearing the transparent material and for enclosing and sealing the perimeter of the collector, each outer frame member having means for attachment to a collector-bearing structure and comprising, in cross-section, at least one inner and at least one outer vertical wall section providing abutment surfaces against lateral movement and at least one upper and at least one lower horizontal section providing abutment surfaces against vertical movement, the at least four abutment surfaces defining a receiving channel parallel to the outer frame member for receiving alignment members; and,
   a plurality of alignment members longitudinally insertable into each of the receiving channels of adjacent outer frame members, the alignment members and receiving channels cooperating to positively align adjacent ends of the outer frame members during and after construction of the solar collector.

9. The solar collector of claim 8, wherein the outer frame members further comprise outwardly projecting flanges which cooperate to frictionally secure flashing around the periphery of the collector.

10. The solar collector of claims 8 or 9, further comprising a plurality of inner frame members extending between the outer frame members and providing auxiliary support surfaces for the transparent material.

* * * * *